United States Patent [19]

Bilski

[11] 4,445,538

[45] May 1, 1984

[54] BIDIRECTIONAL CONTROL VALVE

[75] Inventor: Gerard W. Bilski, Livonia, Mich.

[73] Assignee: Tri-Motion Industries, Inc., Dearborn, Mich.

[21] Appl. No.: 278,731

[22] Filed: Jun. 29, 1981

[51] Int. Cl.³ .............................................. F15B 13/04
[52] U.S. Cl. ................................... 137/596.2; 91/457; 137/636; 251/282
[58] Field of Search ............... 91/428, 457; 137/596.2, 137/636, 871; 251/282

[56] References Cited

U.S. PATENT DOCUMENTS

| | | | |
|---|---|---|---|
| 234,602 | 11/1880 | Moore et al. | 251/282 |
| 1,330,922 | 2/1920 | Tibbels | 91/457 |
| 1,751,276 | 3/1930 | Karibo et al. | 91/457 X |
| 1,993,891 | 3/1935 | Light et al. | 137/596.2 |
| 2,054,346 | 9/1936 | Sittert | 137/596.2 |
| 2,244,829 | 6/1941 | Dick | 91/457 X |
| 3,423,935 | 1/1969 | Budzich | 91/457 X |
| 3,554,091 | 1/1971 | Spyridakis | 91/428 |
| 4,243,060 | 1/1981 | McKendrick | 137/625.69 |

FOREIGN PATENT DOCUMENTS 345061  3/1931  United Kingdom ................ 137/636

Primary Examiner—Gerald A. Michalsky
Attorney, Agent, or Firm—Gifford, VanOphem, Sheridan, Sprinkle & Nabozny

[57] ABSTRACT

A fluid control valve fluidly connected between a source of fluid pressure and a fluid operated device for controlling the pressurization and depressurization of the fluid device. The control valve comprises an elongated housing having an inlet port and an outlet port formed at one axial end of the housing and an exhaust port formed at its other end. The inlet port is connected to the fluid pressure source while the outlet port is connected to the fluid device. A first fluid passageway formed in the housing fluidly connects the inlet port to the outlet port while, similarly, a second fluid passage in the housing fluidly connects the outlet port to the exhaust port. A first valve is disposed in the first fluid passageway and movable between an open and closed position while a second valve is disposed in the second fluid passageway and also movable between an open and closed position. A sleeve is axially slidably mounted to the housing and is coupled to an actuating member so that movement of the sleeve in one direction opens the first valve while movement of the sleeve in the opposite direction opens the second valve.

8 Claims, 3 Drawing Figures

BIDIRECTIONAL CONTROL VALVE

BACKGROUND OF THE INVENTION

I. Field of the Invention

The present invention relates generally to fluid control valves, and, more particularly, to a bidirectional control valve for controlling fluid pressure to and from a fluid powered device.

II. Description of the Prior Art

Fluid powered devices, such as fluid powered lifts and jacks, are widely employed in industry. Such devices are typically pneumatically or hydraulically powered and include an expansible chamber or fluid powered motor for converting pressurized fluid flow to mechanical movement. Thus, by connecting the device to a source of fluid pressure, the fluid device produces mechanical movement in one direction while, conversely, exhaustion of the fluid pressure from the fluid powered device produces mechanical movement in the opposite direction.

In order to pressurize the fluid power device at the desired level, a bidirectional control valve is usually connected between a source of fluid pressure and the fluid powered device. These control valves are selectively operable to connect the fluid powered device with the source of fluid pressure or, alternatively, to exhaust pressurized fluid from the fluid powered device. Such previously known values are conventionally actuated by solenoids, hand levers, push buttons, foot pedals and the like.

These previously known bidirectional control valves, however, have not proven entirely satisfactory in use. One disadvantage of the previously known bidirectional control valves is that the value member must be manually moved to its neutral or closed position following actuation. Failure to do so, however, requires the reverse operation of bidirectional control valve in order to return the fluid device to the desired position.

A still further disadvantage of many of the previously known bidirectional control valves, and particularly solenoid actuated valves, is that while the direction of fluid flow through the valve is controllable the flow rate is not. Consequently, with these types of previously known control valves, accurate positioning of the fluid powered device is difficult, if not altogether impossible. Moreover, when accurate position of the fluid powered device is required, the control valve must be actuated in a reiterative fashion until the desired position of the fluid device is obtained. Such a reiterative process is time-consuming in practice and, therefore, costly.

A still further disavantage of many of the previously known manually operated bidirectional control valves is that the control valve itself must be manually unseated against the force of the fluid pressure. Consequently, when the valve is used to control high pressure fluid sources, it is difficult for the operator to manually unseat the valve against the force of this fluid pressure. Furthermore, when the degree of actuation of the control valve is used to control the flow rate through the control valve, accurate actuation of the control valve, and thus accurate positioning of the fluid powdered device, is difficult to achieve.

SUMMARY OF THE PRESENT INVENTION

The present invention provides an improved bidirectional control valve which overcomes the above-mentioned disadvantages of the previously known control valves and which is relatively inexpensive in construction and yet effective in operation.

In brief, the bidirectional control valve according to the present invention comprises an elongated housing having an inlet port and outlet port formed at one end and an exhaust port formed at its other end. The inlet port is connected to the source of fluid pressure while the outlet port is connected to the fluid powered device. The exhaust port, conversely, is open to the atmosphere in the event that the fluid device is pneumatically operated or, if the device is hydraulically operated, the exhaust port is connected to a hydraulic fluid reservoir.

A first fluid passageway is formed through the housing for fluidly connecting the inlet port to the outlet port while, similarly, a second fluid passageway is formed in the housing for fluidly connecting the outlet port to the exhaust port. A first valve is positioned within the first passageway and movable between an open and a closed position and, likewise, a second valve is positioned within the second passageway and also movable between an open and a closed position. Resilient means urge both the first and second valves toward their closed position.

The opening of the first valve fluidly connects the inlet to the outlet and thus supplies fluid from the pressurized fluid source and to the fluid powered device. Conversely, the opening of the second valve fluidly connects the outlet port to the exhaust port and thus exhaust fluid pressure from the fluid powered device. Both the first and second valves included tapered portions which limit the flow rate through the housing by an amount proportional to the degree of actuation of the first and second valves.

A sleeve is longitudinally slidably mounted to the housing and includes a radially inwardly extending actuating plate positioned between the ends of the first and second valves. Movement of the sleeve in one direction opens the first valve while movement of the sleeve in the opposite direction opens the second valve, thus, the first and second valves can be opened only in a mutually exclusive fashion.

BRIEF DESCRIPTION OF THE DRAWING

A better understanding of the present invention will be had upon reference to the following description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
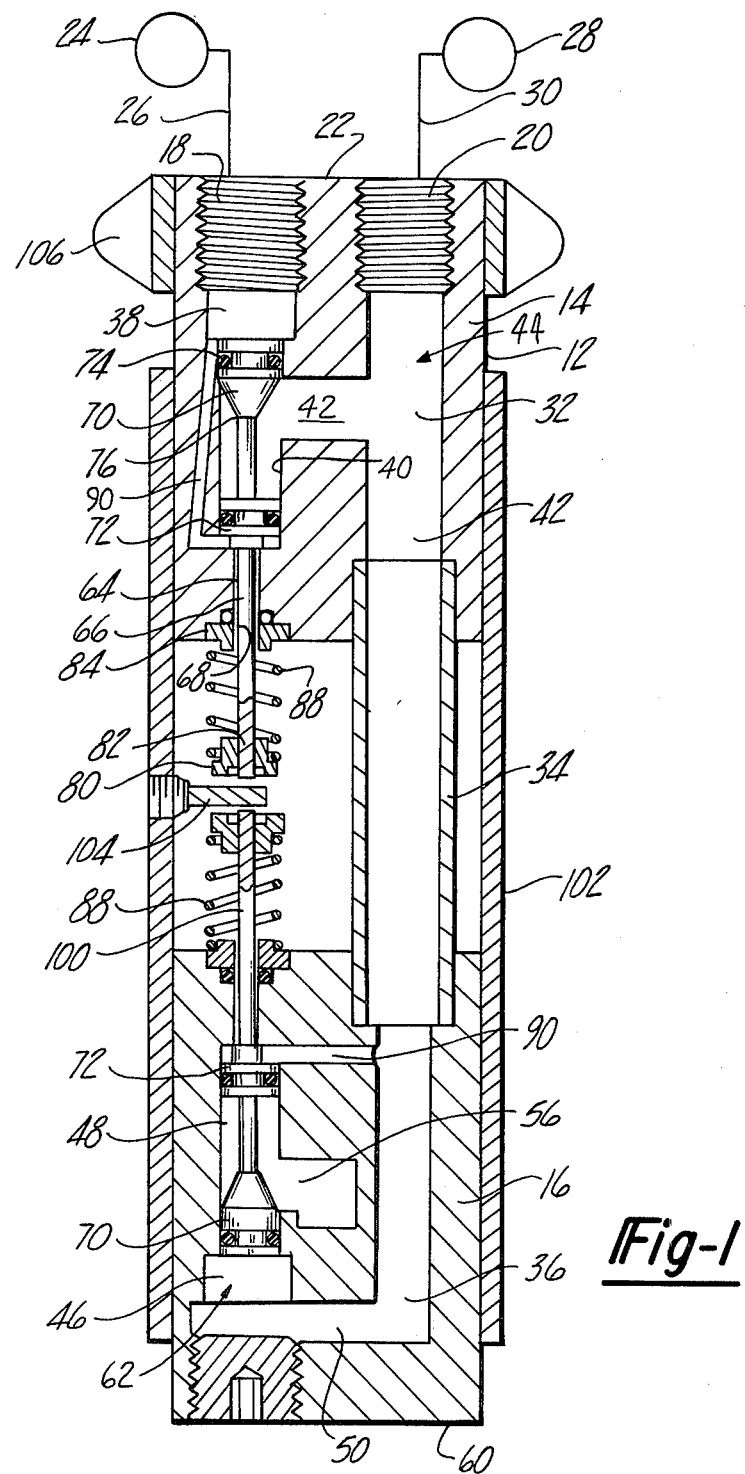
FIG. 1 is a longitudinal sectional view illustrating a preferred embodiment of the bidirectional control valve according to the present invention.
Figure 2:
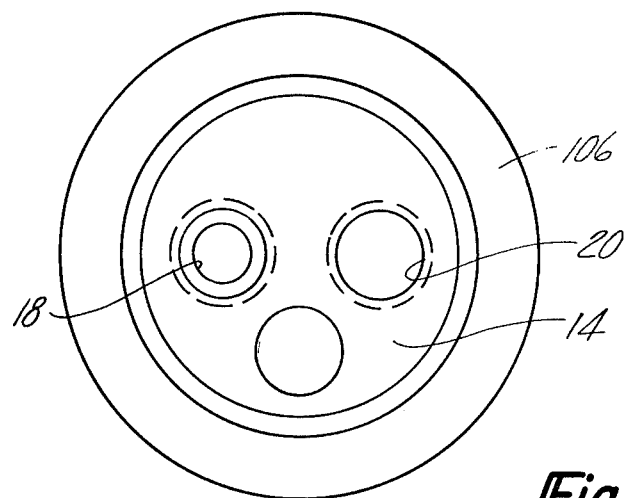
FIG. 2 is a top view thereof.

With reference first to FIGS. 1 and 2, a preferred embodiment of a bidirectional control valve according to the present invention is thereshown and comprises a cylindrical housing 12 having an upper housing part 14 and a lower housing part 16. Both housing parts 14 and 16 are substantially cylindrical in cross section and the housing parts 14 and 16 are coaxially aligned.

An inlet port 18 and outlet port 20 are formed in the outwardly facing axial end 22 of the upper housing part 14 and both ports 18 and 20 are internally threaded for connection with conventional fluid couplings (not shown). The inlet fluid port 18 is connected to a source of fluid pressure 24 by a fluid line 26 while, similarly, the outlet port 20 is connected to a fluid powered device 28 by a fluid line 30. The device 28 can be of any conventional construction, such as a pneumatic hoist or jack, and, therefore, is illustrated only diagrammatically.

An axial throughbore 32 is formed through the upper housing part 14 in alignment with the outlet port 20 and is fluidly connected to a tube 34 to an axially extending bore 36 formed in the lower housing part 16. The tube 34 thus extends between and is secured to both housing parts 14 and 16.

Referring now particularly to FIG. 1, the inlet port 18 is also open to an axially extending bore 38 formed in the upper housing part 14. The bore 38 includes a reduced diameter portion 40 while a cross passage 42 in the upper housing part 14 fluidly connects the reduced diameter portion 40 of the bore 38 with the bore 32. The bore 38, cross bore 42 and upper portion of the bore 32 thus form a first fluid passageway 44 which interconnects the fluid inlet port 18 to the outlet port 20.

Figure 3:
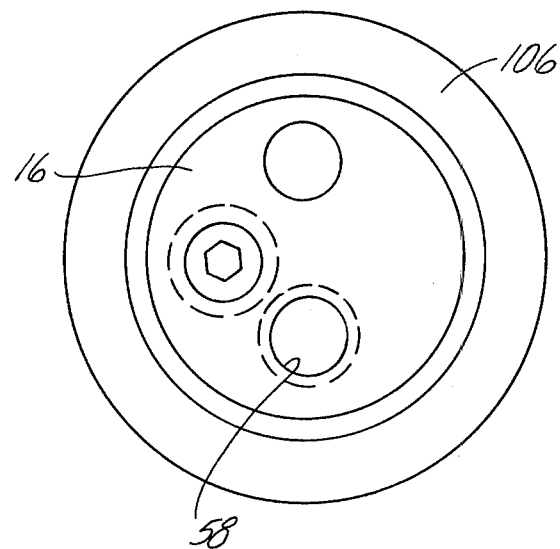
FIG. 3 is a bottom view thereof.

Referring now particularly to FIGS. 1 and 3, an axially extending bore 46 is formed in the lower housing part 16 and includes a reduced diameter portion 48. The lower portion of the exhaust port 36 is then connected by a cross passage 50 to the axial bore 46. A passage 56 in turn fluidly connects the reduced diameter portion 48 of the bore 46 with an exhaust port 58 (FIG. 3) formed in the outwardly facing axial end 60 of the lower housing part 16. The bores 32, 36, 50, 46 and passage 56 together with the tube 34 form a second fluid passageway 62 which fluidly connects the outlet port 20 to the exhaust port 58.

With reference now particularly to FIG. 1, the bidirectional control valve further comprises an elongated valve 64 for operatively controlling the fluid flow through the first passageway 44 in a manner which will shortly become apparent. The valve 64 includes an elongated stem 66 which is axially slidably mounted in a bore 68 formed in the upper housing part 14. A first valve land 70 is formed at one end of the step 68 while a second land 72 is formed at a midpoint of the valve stem 66.

The first land 70 carries a seal 74 about its outer periphery which sealingly engages the reduced diameter portion 40 of the inlet bore 38 at a position between the inlet port 18 and the cross passage 42. The second land 72 also carries a seal 74 and sealingly engages the reduced diameter portion 40 of the bore 38 but at a position spaced inwardly from the cross passage 44.

The valve 64 is axially movable between a closed position, illustrated in FIG. 1, and an open position in which the valve 64 is axially moved or shifted toward the inlet port 18. In its closed position, the first land 70 sealingly engages the reduced diameter portion 40 of the bore 38 and thus blocks fluid flow through the passageway 44 between the inlet port 18 and outlet port 20. Conversely, as the valve member 64 is shifted toward the inlet port 18, the first land 70 opens the bore 38 and permits fluid to flow from the inlet port 18, through the cross passage 42 and out to the outlet port 20. In addition, the first land 70 preferably includes a tapered portion 76 at its inner end to variably restrict the opening between the bore 40 and the valve land 70 in dependence upon the amount of axial displacement of the valve 64. The land tapered portion 76 thus limits the maximum flow rate from the inlet 18 and to the outlet 20 in dependence upon the amount of actuation of the valve member 64.

A spring retainer 80 is secured to the end 82 of the valve stem 66 opposite from the land 70 while a similar spring retainer 84 is nested within a recess at the inner end of the upper housing part 14. A compression spring 88 is entrapped between the spring retainers 80 and 84 and urges the valve 64 to its closed position thus blocking fluid flow between the inlet port 18 and outlet port 20.

Still referring to FIG. 1, the upper housing part 14 includes a pressure equalization passage 90 open at one end to the inlet port 18 and open at its other end to the lower end of the second valve land 72. Thus, the fluid pressure at the inlet port 18 communicates through the equalization passage 90 to the second valve land 72 and urges the valve 64 axially toward the inlet port 18. Simultaneously, however, the fluid pressure of the inlet port 18 acts upon the upper end of the first land 70 which urges the first valve 64 axially into the housing 12. Consequently, the pressure forces exerted upon the lands 70 and 72 urge the valve 64 in opposite directions and effectively cancel out each other. The valve 64 thus can be axially displaced against the force of the compression spring 88 by using the same manual force regardless of the pressure at the inlet port 18.

The bidirectional control valve according to the present invention further comprises a second valve 100 which is axially slidably mounted in the lower housing part 16. The second valve 100 is axially aligned with and substantially identical to the first valve 64 and, therefore, will only be briefly described, it being understood that like reference characters between the first valve 64 and second valve 100 refer to like parts.

The outermost land 70 of the second valve 100 sealingly engages the reduced diameter portion 48 of the bore 46 at a position between the cross passageways 56 and 50 when in its closed position thus blocking fluid flow from the outlet port 20 and to the exhaust port 58. The second valve, however, can be axially slid outwardly toward the end 60 of the second housing part 16 against the force of its compression spring 88 and, in doing so, permits fluid flow from the outlet port 20 and to the exhaust port 58. An equalization passage 90 is also formed through the lower housing part 16 and fluidly communicates the pressure at the outlet port 20 to one side of the second land 72 of the second valve 100. This equalization port 90, as before, exerts a force on the second land 72 which is equal to but opposite from the force exerted on the first land 70.

A cylindrical sleeve 102 is axially slidably mounted around the outer periphery of the housing 12. An actuating plate 104 is secured to and extends radially inwardly from the sleeve 102 so that the actuating plate 104 is positioned in between the spring retainers 80 on the first and second valve 64 and 100, respectively. Thus, as the sleeve 102 is moved upwardly toward the end 22 of the upper housing part 14, the actuating plate abuts against the first valve spring retainer 80 and opens the first valve 64 against the force of the compression spring 88. When this occurs, fluid communication is established through the first passageway 44 thus permitting fluid flow from the inlet port 18 and to the outlet port 22. Conversely, when the sleeve 102 is axially slid in the opposite direction, the actuating plate 104 abuts against the second valve spring retainer 80 and moves the second valve 100 to its open position. When this occurs, fluid communication from the outlet port 20 and to the exhaust port 58 is established through the passageway 62.

The compression springs 88 on the first and second valve 64 and 100, respectively, urge these valves to their closed position thus blocking fluid flow through the bidirectional control valve. These springs 88 also serve to return the sleeve 102 to its central nonactuating position whenever the sleeve 102 is released. A thumb ring 106 is preferably attached to the upper end of the upper housing part 14 to facilitate the manual actuation of the sleeve 102.

In operation, the sleeve 102 is moved upwardly to pressurize the fluid powered device 28 from the pressure source 24. Furthermore, the fluid flow rate through the bidirectional control valve can be easily controlled by the degree or amount of actuation of the first valve 64 due to the tapered portion 76 and the first valve land 70. The valve can also be easily manually opened regardless of the pressure at the pressure source 24 due to the equalization passage 90.

When it is desired to decrease or lower the pressure in the fluid powered device 28, the sleeve 102 is slid downwardly toward the lower housing part 16 and, in doing so, opens the second valve 100 against the force of its compression spring 88. When the valve 100 opens, fluid communication is established between the outlet port 20 and exhaust port 58 so that the fluid pressure from the device 28 can exhaust through the passageway 62 and out through the exhaust port 58. As with the first valve 62, the flow rate through the exhaust 58 can be controlled by the degree or amount of actuation of the second valve 100 due to the tapered portion 76 on the second valve land 70. The equalization passage 90 in the lower housing part 16, as before, enables the valve 100 to be easily manually opened by the sleeve 102 regardless of the pressure in the passageway 62.

From the foregoing, it can be seen that the bidirectional control valve according to the present invention provides a valve for controlling a fluid powered device, such as a lift or a jack, which can be easily manually operated and is relatively inexpensive in construction.

Furthermore, the device according to the present invention enables the fluid flow rate to or from the fluid powered device 28 to be easily manually controlled and limited as desired for accurate positioning of the fluid powered device 28. The bidirectional control valve is also advantageous in that it automatically terminates all fluid flow to or from the fluid powered device 28 upon the manual release, intentional or inadvertent, of the sleeve 102.

A still further advantage of the bidirectional control valve according to the present invention is that the first valve 64 and second valve 100 are substantially identical to construction. Since the valve 64 and 100 are the only components of the bidirectional valve which require periodic maintenance, the inventory of spare parts necessary to service the bidirectional control valve is minimized.

In addition, the valves 64 and 100 can be opened only in a mutually exclusive fashion thus preventing a possible safety hazard that might otherwise occur if both valves could be simultaneously opened.

Having described our invention, however, many modifications thereto will become apparent to those skilled in the art to which it pertains without deviations of the spirit of the invention as defined by the scope of the appended claims.

We claim:

1. A fluid control valve comprising:
   an elongated housing, said housing having an inlet port, outlet port and exhaust port formed on at least one of its axial ends,
   first fluid passage means formed in said housing for fluidly connecting said inlet port to said outlet port,
   second fluid passage means formed in said housing for fluidly connecting said outlet port to said exhaust port,
   a first valve operatively disposed in said first fluid passage means and movable between an open and a closed position,
   means for resiliently urging said first valve towards its closed position,
   a second valve operatively disposed in said second fluid passage means and movable between an open and a closed position,
   means for resiliently urging said second valve towards its closed position,
   means for selectively and independently moving said first valve and said second valve to their respective open positions comprising a sleeve longitudinally slidably mounted to said housing and an actuating member secured to and extending radially inwardly from said sleeve, said actuating member abutting against and moving said first valve to its open position when said sleeve is slid in one direction and said actuating member abutting against and moving said second valve to its open position as said sleeve is slid in the opposite direction and wherein and first and second valves can be opened only mutually exclusively,
   wherein said first and second valves are elongated and slidably received in valve bores formed in the housing, and
   wherein said first and second valves each have at least two axially spaced lands, one side of one first valve land being open to said inlet port so that pressure at said inlet port urges said one first valve land in one axial direction and a first fluid passageway for fluidly connecting said inlet port to one side of the other first valve land so that pressure at said inlet port urges said other first valve land in an axial direction opposite from said one axial direction, one side of one second valve land being open to the outlet port so that pressure at said outlet port urges said one second valve land in a predetermined axial direction and a second fluid passageway formed in said housing for fluidly connecting said outlet port to one side of the other second valve land so that pressure at said outlet port urges said other second valve land in a direction opposite from said predetermined axial direction,
   whereby said inlet port pressure on said sides of said first valve lands exert equal and opposite forces on said first valve and
   whereby said outlet port pressure on said sides of said second valve lands exert equal and opposite forces on said second valve.

2. The invention as defined in claim 1 wherein said inlet and outlet ports are formed on one end of the housing while said exhaust port is formed at the other end of the housing.

3. The invention as defined in claim 1 wherein said housing is cylindrical in cross section.

4. The invention as defined in claim 1 wherein said first and second valves are axially aligned with each other.

5. The invention as defined in claim 1 and further comprising means for limiting the flow rate through either of said valves proportionately to the longitudinal displacement of either of said valves.

6. The invention as defined in claim 5 wherein said limiting means further comprises a tapered portion on each of said valves.

7. The invention as defined in claim 1 wherein said housing comprises an upper housing part, a lower housing part and a tube having an inner bore extending between and secured to said housing parts, said tube inner bore forming a portion of said second passage means.

8. The invention as defined in claim 1 wherein said first and second valves are substantially identical to each other.

* * * * *

UNITED STATES PATENT AND TRADEMARK OFFICE
CERTIFICATE OF CORRECTION

PATENT NO. : 4,445,538
DATED : May 1, 1984
INVENTOR(S) : Gerard Bilski

It is certified that error appears in the above—identified patent and that said Letters Patent is hereby corrected as shown below:

Column 3, line 42 delete "step" and insert --stem--.

Claim 1, line 32 delete "wherein and" and insert --wherein said--.

Signed and Sealed this

Twenty-third Day of October 1984

[SEAL]

Attest:

GERALD J. MOSSINGHOFF

Attesting Officer     Commissioner of Patents and Trademarks